United States Patent [19]

Lutz et al.

[11] Patent Number: 4,671,932
[45] Date of Patent: Jun. 9, 1987

[54] NICKEL-BASED HARD ALLOY

[75] Inventors: Reinhold Lutz, Rheinfelden, Fed. Rep. of Germany; Helgo Wendt, deceased, late of Laufenburg, Fed. Rep. of Germany, by Margarete M. Wendt, Jorg G. Wendt, legal representatives; Helmut Meinhardt, Laufenburg; Heinz Eschnauer, Freigericht, both of Fed. Rep. of Germany; E. Lugscheider, AZ Vaals, Netherlands

[73] Assignee: Herman C. Starck Berlin, Berlin, Fed. Rep. of Germany

[21] Appl. No.: 604,821

[22] Filed: Apr. 27, 1984

[30] Foreign Application Priority Data

May 2, 1983 [DE] Fed. Rep. of Germany ....... 3315920
Sep. 19, 1983 [DE] Fed. Rep. of Germany ....... 3333808

[51] Int. Cl.$^4$ ............................................. C22C 19/05
[52] U.S. Cl. ..................................... 420/452; 75/254; 75/255
[58] Field of Search ................. 420/442, 452; 75/238, 75/239, 240, 252, 254, 255; 148/410, 427

[56] References Cited

U.S. PATENT DOCUMENTS

| | | | |
|---|---|---|---|
| 2,888,740 | 6/1959 | Danis | 29/517 |
| 3,304,604 | 2/1967 | Quaas | 29/527.3 |
| 4,089,466 | 5/1978 | Lomax et al. | 428/668 |
| 4,161,207 | 7/1979 | Fluckiger et al. | 428/627 |
| 4,192,672 | 3/1980 | Moskowitz et al. | 75/254 |
| 4,194,910 | 3/1980 | Mal et al. | 75/239 |
| 4,228,223 | 10/1980 | Knotek et al. | 428/558 |

FOREIGN PATENT DOCUMENTS

| | | | |
|---|---|---|---|
| 2011498 | 9/1971 | Fed. Rep. of Germany . | |
| 3018007 | 11/1981 | Fed. Rep. of Germany | 75/255 |
| 2307214 | 5/1976 | France . | |

Primary Examiner—L. Dewayne Rutledge
Assistant Examiner—Robert L. McDowell
Attorney, Agent, or Firm—Ladas & Parry

[57] ABSTRACT

In order to obtain, in a hard alloy based on a nickel-chromium-boron-silicon alloy, particularly advantageous properties with regard to hardness and toughness, carbides of the elements vanadium, niobium, tantalum and/or chromium are added to the hard alloy.

1 Claim, No Drawings

1

NICKEL-BASED HARD ALLOY

The invention relates to a hard alloy which is based on a nickel-chromium-boron-silicon alloy, and which is characterized by particularly advantageous properties in terms of hardness and toughness.

The major importance of the nickel-chromium-boron-silicon hard alloys is documented by a large number of publications, from which a profusion of possible uses can be perceived. Among these possible applications, the wear-resistant overlay coatings are of special significance, these coatings being obtained, on certain base materials, by thermal spraying or deposition-welding.

A comprehensive review of the chemical compositions nickel-based hard alloys is given in Vol. 20 of the "Stahl-Eisen-Bücher [Steel-Iron Books]", entitled "Hartlegierungen zum Verschleissschutz [Hard Alloys for Wear-Protection]", Düsseldorf, 1975, pages 78 and 79 (Table 1) reproduced herein. Other parts of this publication contain information regarding a large number of possible applications.

Furthermore, German Offenlegungsschrift No. 3,018,007 describes a composite filler material, in powder form, this material containing, in addition to a nickel-chromium-boron-silicon alloy, a nickel-chromium-boron-silicon alloy to which tungsten, carbon and iron have been added. In the known hard alloys, the carbon content is kept as low as possible, amounting, at most, to 1% by weight.

Of the known nickel-chromium-boron-silicon alloys, those which, in Table 1 of the abovementioned compilation, are designated by the numbers 43, 53, 58 and 85 are of particular interest. In order to distinguish and describe these four named alloy types, the reader is referred to Table 2, which follows, and from which the relationship between the alloy composition and the characteristic properties becomes apparent. This relationship between the properties and compositions of the alloys will now be described.

The increase in hardness (Rockewll Hardness HRC and Vickers Hardness HV50) is characteristic of the named alloys, the hardness measurements being performed on protective layers composed of these alloys. It becomes clear that an increase in hardness can be obtained as the chromium, boron, silicon and carbon contents increase. However, as the hardness increases, the alloy also becomes increasingly brittle, this effect manifesting itself in various ways, which include the appearance of distinct cracks at the corners of the pyramidal impressions which are produced in the course of Vickers hardness measurements, these cracks being visible under the microscope and exhibiting a total length (for all four corners) which is quoted, in Tables 2 and 3, as the "Sum of the crack lengths", or SCL. When the higher-alloyed nickel-based alloy is employed as an anti-wear layer—especially when additional hard-material particles are embedded—its brittleness leads to the undesirable side-characteristic whereby embedded materials of this nature break out, in a preferential manner, when mechanical stresses are applied, and thereby lead to undesirable shortening of the service lives of the materials to which such overlay coatings have been applied. The alloy with the lowest metalloid content, namely of boron, silicon and carbon, admittedly exhibits no cracks, but its hardness is insufficiently high.

When hard alloys of the above-mentioned type are used as materials which are to be deposited to form antiwear layers, for example by means of thermal spraying or deposition-welding, many grades of steel are unsuitable as base materials, or are of only limited suitability, because different thermal-expansion coefficients result in the destruction of the overlay coatings during their application by techniques involving heat, or on subsequent subjection to thermal stresses. A whole assortment of highly-alloyed steels cannot therefore be considered for coating with the known, brittle hard alloys, since the abovementioned disadvantages occur, examples of such materials being, inter alia, valve steels, fitting steels and spring steels.

When hard alloys of the abovementioned type are being using, in powder form, as materials which are to be deposited as anti-wear layers, in combination with a multiplicity of other types of hard material, also in the form of powder, it is important that the hard alloy serving as the matrix for the hard-material particles be sufficiently tough to resist stressing of the anti-wear surface overlay as a result of impacts, shocks or vibration, while at the same time binding the embedded hard-material particles when subjected to friction-induced stresses.

The objects of the present invention is accordingly to improve the properties of the nickel-based alloys in a manner such that the properties which, according to Table 2, are mutually contradictory, namely high toughness in association with high hardness, can be combined in a desirable way.

One solution to this problem is afforded when one of the hard alloys cited in Table 1 and based on a nickel-chromium-boron-silicon alloy, contains 22 to 27% by weight of chromium and 2.5 to 3.5% by weight of carbon in the form of chromium carbide, preferably $Cr_3C_2$, and/or as elementary carbon, the other constituents of the known hard alloy being correspondingly reduced, essentially by the same percentage in each case. This applies, in particular, in the case of the known nickel-based alloys cited in Table 2. Thus, in the case of an alloy known as "Colmonoy 4" (alloy-designation of the Wall Colmonoy Company), cited as an example in Table 2, hardness values of HRC 60, or 880 HV50, are obtained by adding specified amounts of chromium carbide, while at the same time, however, obtaining an alloy exhibiting a high degree of toughness which—express in terms of the sum of the crack lengths—results in values of only 50 μm. Compared to the approximately equally hard "Colmonoy 8" alloy cited in Table 2, this toughness is remarkably high. The addition of $CR_3C_2$ to the Ni—CR—B—Si alloy known as "Colmonoy 4", in amounts of $Cr_3C_2$ ranging from 15 to 23% by weight, relative to the basic alloy, brings about an increase in the hardness of the material while at the same time retaining the toughness of the basic alloy.

The quoted properties are obtained, in particular, when the composition of the hard alloy conforms to the following concentration-ranges:
  22 to 27% by wt. of chromium,
  3 to 4% by wt. of silicon,
  2.5 to 3.5% by wt. of carbon,
  4 to 4.5% by wt. of iron,
  2.5 to 2.7% by wt. of boron,
  the balance being nickel.

An alloy of the above type is obtained either by adding appropriate amounts of chromium carbide, preferably $Cr_3C_2$, as an alloying additive, to known hard alloys, such as those cited in Table 2, or, alternatively, by making up the composition from the individual components, namely chromium and elementary carbon, in appropriate proportions.

It has been found, furthermore, that the carbides of the metals belonging to the 5th sub-group of the Periodic System, primarily, however, tantalum carbide, also exhibit an effect analogous to that of chromium carbide $Cr_3C_2$ on the properties of nickel-based hard alloys.

For example, in order to manufacture a hard alloy according to the invention, alloys of the known type "Colmonoy 6", originally containing 13.5% of chromium, 3% of boron, 4.25% of silicon, 0.75% of carbon and 4.75% of iron, the balance being nickel, were melted in a vacuum induction furnace and 5, 10 or 20% by weight of the carbides VC, NbC, or TaC, as appropriate in each case, were introduced into the alloy melts. The structures of the solidified melts, following casting, were examined metallographically, and the resulting materials were subjected to hardness and toughness testing.

The results of these melting trials are summarized in Table 3. The Ni-based alloy "Colmonoy 6" was used as a reference material. As the tabulated values show, the addition, according to the invention, of the hard materials, VC, NbC, or TaC results in a considerable increase in hardness (HV50 or HRC) in the novel alloys, whereas the "Sum of the crack lengths", the μm, which reproduces the toughness, was markedly reduced in the majority of cases, and slightly reduced in others ( Trial 4). The sharp increase in the sum of the crack lengths with increasing VC content in Trial 3 indicates that an alloying addition of 20% VC is already far in excess of the optimum.

According to the measured values which are available, tantalum carbide has an excellent effect in the sense according to the invention, exhibiting, when present in a proportion corresponding to only 5% by weight of the alloy, almost the full effect which can be obtained. Tantalum carbide also has a very good effect, in the sense according to the invention, even when present in proportions of 2% by weight, and above, as well as when in proportions ranging from 25 to 30% by weight.

The addition, according to the invention, of VC, NbC, or TaC is not restricted to the known alloy Colmonoy 6, but is relevant to all known alloy types based on a nickel-chromium-boron-silicon alloy, as listed in Table 1. The hard alloys cited in Table 2 are of particular interest.

The use, according to the invention, of hard materials of the abovementioned type is, of course, not restricted to the pure metal carbides which have been mentioned, since the solid solutions formed by binary and ternary mixtures of these carbides are, in addition, also effective, and in an advantageous manner. In addition to the carbides which have been mentioned, and mixtures thereof, the carbonitrides of the abovementioned elements, or solid-solution phases of these carbonitrides, can also be regarded as being suitable, in the sense of the invention , in any proportions whatever.

The application of the advantages of the novel alloys according to the invention is, of course, not restricted solely to workpieces which are produced by casting. Mention may be made of the following further forms in which these alloys may be used, namely as alloy powders, in the pure form, or in combination with further hard materials for thermal-spraying purposes, or for spray-welding purposes, deposition-welding, etc.

Furthermore, the alloys are suitable as materials for electrodes, rods, filler wires, or castings (full-mold type), as well as for products involving dead-mold casting and form-sintering.

The possible applications as anti-wear materials, or as materials for corrosion protection, are very numerous, and readers are referred to Vol. 20, "Stahl-Eisen-Bücher [Steel-Iron Books]", entitled "Hartlegierungen zum Verschleissschutz [Hard Alloys for Wear-Protection]", Düsseldorf, 1975.

A particularly advantageous form in which the alloy according to the invention can be used involves the application of the alloy to base material, in wear-related technology, which, owing to their differing thermal expansion behavior, usually cannot be armored with extremely hard anti-wear layers. In such cases, the alloy according to the invention guarantees that the deposited layers, despite having a high hardness, adhere excellently when the composition materials are subjected to thermal stresses, which does not occur in the case of hard alloys according to the state of the art. The alloy according to the invention, in the form of powder or wire, is preferably applied to the underlying material by means of thermal deposition-spraying (flame-spraying or plasma-spraying), after which it receives a mechanical finishing treatment, employing a generally conventional technique, for example by grinding and polishing, or some similar method.

Rods represent a further preferred use-form, their application to the base material being effected by means of electric arc depositioning-welding.

In place of wires, the hard-alloy powders can also be employed in the form of so-called "cords" (powder-strands sheathed with plastic film or metal foil), for thermal-spraying purposes. Moreover, the alloy is capable of being used, in rod form, as a high-temperature solder.

TABLE 1

| Alloy No. | Product form | | | | Alloy composition (bal. nickel) wt. % | | | | | |
| --- | --- | --- | --- | --- | --- | --- | --- | --- | --- | --- |
| | Rods | Sheathed Rods | Castings | Powder | Cr | C | Si | B | Fe | Additional elements |
| 1 | | | | / | | | 1.7 | 1.2 | 0.5 | |
| 2 | | | | / | | | 2.0 | 0.9 | 0.2 | |
| 3 | | | | / | | | 2.3 | 1.2 | <1.5 | |
| 4 | | | | / | | | 2.4 | 1.4 | | |
| 5 | | | | / | | | 2.4 | 1.5 | 0.3 | |
| 6 | | | | / | | | 2.5 | 1.5 | 0.0–1.5 | |
| 7 | | | | / | | | 2.5 | 2.0 | 0.3 | |
| 8 | | | | / | | | 2.6 | 2.0 | 0.5 | |
| 9 | | | | / | | | 2.7 | 1.4 | 0.13 | |
| 10 | | | | / | | | 2.7 | 1.5 | 0.4 | |
| 11 | | | | / | | | 3.3 | 2.5 | 0.4 | |
| 12 | | | | / | | | 3.4 | 1.35 | <3.0 | |
| 13 | | | | / | | | 3.5 | 1.9 | 0.4 | |
| 14 | | | | / | | | 4.0 | 3.3 | | |

TABLE 1-continued

| | Product form | | | | Alloy composition (bal. nickel) wt. % | | | | | |
|---|---|---|---|---|---|---|---|---|---|---|
| Alloy No. | Rods | Sheathed Rods | Castings | Powder | Cr | C | Si | B | Fe | Additional elements |
| 15 | | | | / | | | 4.5 | 2.9 | | |
| 16 | | | | / | | | 4.5 | 3.0 | | |
| 17 | | | | / | 1.0 | 0.06 | 2.5 | 1.5 | 1.5 | |
| 18 | | | | / | 1.2 | | 2.5 | 1.3 | | |
| 19 | | | | / | 5.0 | 0.25 | 3.0 | 1.0 | 3.5 | |
| 20 | | | | / | 5.0 | 0.25 | 3.25 | 1.25 | 3.0 | |
| 21 | | | | / | 5.0 | 0.25 | 4.0 | 1.25 | 2.0 | |
| 22 | | | | / | 5.5 | 0.2 | 2.9 | 1.5 | 1.3 | |
| 23 | | | | / | 7.0 | | 4.0 | 2.5 | 3.0 | |
| 24 | | | | / | 7.0 | | 4.5 | 2.9 | 3.0 | |
| 25 | | | | / | 7.0 | 0.1 | 4.5 | 3.2 | 3.0 | 6 W |
| 26 | | | | / | 7.3 | 0.6 | 3.6 | 2.7 | 1.9 | |
| 27 | / | | / | / | 7.5 | | 4.0 | 1.5 | 1.5 | |
| 28 | | | | / | 7.5 | 0.09 | 4.52 | 2.63 | 2.72 | |
| 29 | | | | / | 8.0 | 0.2 | 4.6 | 3.1 | 3.3 | |
| 30 | | | | / | 9.0 | 0.3 | 3.25 | 1.8 | 3.25 | |
| 31 | | | | / | 9.0 | 0.3 | 3.5 | 2.5 | 3.5 | |
| 32 | | | | / | 9.0 | 0.45 | 3.0 | 2.0 | 3.75 | |
| 33 | | | | / | Alloy No. 32 + 35% (WC + 10 Co) | | | | | |
| 34 | | | | / | 9.53 | 0.14 | 3.29 | 1.88 | 3.54 | |
| 35 | | | | / | 9.6 | 0.1 | 3.7 | 2.26 | 0.43 | |
| 36 | | | | / | 9.9 | 0.6 | 2.5 | 1.7 | 2.4 | |
| 37 | / | | / | / | 10.0 | | 4.0 | 1.5 | 4.0 | |
| 38 | | | | / | 10.0 | | 3.0 | 1.9 | 4.0 | |
| 39 | | | | / | 10.0 | 0.04 | 3.5 | 2.0 | 0.5 | 0.3 Mn |
| 40 | | | | / | 10.0 | 0.15 | 2.5 | 2.5 | 2.5 | |
| 41 | | | | / | 10.0 | 0.4 | 3.5 | 2.0 | 3.0 | |
| 42 | | | | / | 10.0 | 0.4 | 3.5 | 2.5 | 3.5 | 12 W |
| 43 | / | | | / | 10.0 | 0.45 | 2.25 | 2.0 | 2.5 | |
| 44 | | | | / | 10.0 | 0.45 | 2.5 | 2.0 | 2.5 | |
| 45 | | | | / | 10.0 | 0.6 | 4.5 | 3.2 | | |
| 46 | | | | / | 10.5 | 0.1 | 2.0 | 2.0 | 3.0 | |
| 47 | | | | / | 10.5 | 0.1 | 3.2 | 2.0 | 1.5 | |
| 48 | | | | / | 11.0 | | 3.0 | 2.0 | 4.0 | |
| 49 | | | | / | 11.0 | | 4.0 | 2.0 | 4.0 | |
| 50 | | | | / | 11.0 | 0.07 | 4.26 | 2.07 | 3.75 | |
| 51 | / | | | / | 11.0 | 0.45 | 2.25 | 2.5 | 2.25 | |
| 52 | | | | / | 11.5 | 0.55 | 3.25 | 2.5 | 3.75 | 16 W |
| 53 | / | | | / | 11.5 | 0.65 | 3.75 | 2.5 | 4.25 | |
| 54 | | | | / | 11.9 | 0.38 | 3.54 | 2.15 | 3.38 | |
| 55 | | | | / | 12.0 | 0.5 | 3.6 | 2.6 | 3.3 | |
| 56 | | | | / | 12.5 | 0.7 | 4.0 | 2.75 | 4.5 | |
| 57 | | | | / | 13.0 | 0.8 | 3.7 | 2.8 | 3.25 | 12 W |
| 58 | / | | | / | 13.5 | 0.75 | 4.25 | 3.0 | 4.75 | |
| 59 | | | | / | 13.5 | 0.1 | 4.5 | 3.5 | 4.5 | |
| 60 | | | | / | 14.0 | 0.5 | 4.0 | 3.0 | 4.0 | |
| 61 | | | | / | 14.0 | 0.6 | 3.5 | 2.75 | 4.0 | |
| 62 | | | | / | 14.0 | 0.65 | 3.8 | 2.8 | 3.75 | |
| 63 | | | | / | 14.0 | 0.65 | 3.75 | 2.75 | 3.75 | |
| 64 | | | | / | 14.0 | 0.66 | 4.25 | 3.15 | 4.5 | |
| 65 | | | | / | 14.0 | 0.7 | 4.5 | 3.5 | 4.5 | |
| 66 | / | | | / | 14.0 | 0.75 | 4.0 | 3.25 | 4.0 | |
| 67 | | | | / | 14.5 | 0.75 | 4.5 | 3.5 | 4.5 | |
| 68 | / | | / | / | 15.0 | | 4.5 | 3.0 | 4.5 | |
| 69 | | | | / | 15.0 | 0.6 | 4.2 | 3.0 | 3.7 | |
| 70 | | | | / | 16.0 | | 4.5 | 3.0 | 4.0 | |
| 71 | | | | / | 16.0 | | 4.5 | 3.5 | 4.0 | |
| 72 | | | | / | 16.0 | 0.4 | 4.0 | 4.0 | 3.0 | 2.5 W 2.5 Mo 2.5 Cu |
| 73 | | | | / | 16.0 | 0.5 | 4.0 | 4.0 | 2.5 | 3 Mo 3 Cu |
| 74 | | | | / | 16.0 | 0.7 | 4.3 | 3.0 | 3.9 | |
| 75 | | | | / | 16.5 | 0.9 | 4.25 | 3.25 | 3.75 | |
| 76 | | | | / | 17.0 | 0.28 | 4.25 | 3.75 | | 0.3 Mn |
| 77 | | | | / | Alloy No. 76 + 50% WC | | | | | |
| 78 | | | | / | 17.0 | 0.28 | 4.25 | 3.75 | | 2.3 Mo 2.3 Cu 0.3 Mn |
| 79 | | | | / | Alloy No. 78 + 50% WC | | | | | |
| 80 | | | | / | 17.0 | 0.95 | 3.9 | 3.3 | 2.0 | |
| 81 | | | | / | Alloy No. 80 + 15% (WC + 10 Co) | | | | | |
| 82 | | | | / | Alloy No. 80 + 50% (WC + 10 Co) | | | | | |
| 83 | | | | / | 17.0 | 1.0 | 4.0 | 3.5 | 4.0 | |
| 84 | | | | / | 17.0 | 1.0 | 4.5 | 3.5 | 4.0 | |
| 85 | | | | / | 26.0 | 0.95 | 4.0 | 3.5 | 1.0 | |
| 86 | | | | / | 29.0 | 2.35 | 0.6 | | | 10 Co, 15 W |

TABLE 2

| Composition | Colm. 4 (43)* | Colm. 5 (53)* | Colm. 6 (58)* | Colm. 8 (85)* | Invention |
| --- | --- | --- | --- | --- | --- |
| \multicolumn{6}{c}{Properties of nickel-based alloys} | | | | | |
| % Ni | Bal. | Bal. | Bal. | Bal. | 65–70 |
| % Cr | 10 | 11.5 | 13.5 | 26.0 | 22–27 |
| % B | 2.0 | 2.5 | 3.0 | 3.5 | approx. 2.5 |
| % Si | 2.25 | 3.75 | 4.25 | 4.0 | 3–4 |
| % C | 0.45 | 0.65 | 0.75 | 0.95 | 2.5–3.5 |
| % Fe | 2.5 | 4.25 | 4.75 | 1.0 | 4–4.5 |
| \multicolumn{6}{c}{Hardness comparison (own measurements)} | | | | | |
| HRC | 30 | 44 | 53 | 55 | 60 |
| HV50 | 80 | 535 | 625 | 690 | 880 |
| SCL+ | 0 | 23 | 255 | 344 | 50 |

+ Sum of the crack lengths (own measurements), in μm, as a measure of the toughness.
*Number assigned to the alloy in Table 1.

TABLE 3

Properties of Type C 6* nickel-based hard alloys, to which carbides of elements of the 5th sub-group of the Periodic System have been added, in different amounts.

| Trial No. | Alloy and addition | Vickers Hardness HV50 | Rockwell Hardness HRC | SCL+ (μm) |
| --- | --- | --- | --- | --- |
| 0 | Type C 6* without addition | 625 | 53 | 255 |
| 1 | Type C 6 + 5% VC | 696 | 55 | 81 |
| 2 | Type C 6 + 10% VC | 779 | 56 | 162 |
| 3 | Type C 6 + 20% VC | 889 | 60 | 371 |
| 4 | Type C 6 + 5% NbC | 779 | 55 | 215 |
| 5 | Type C 6 + 10% NbC | 816 | 58 | 122 |
| 6 | Type C 6 + 20% NbC | 878 | 58 | 133 |
| 7 | Type C 6 + 5% TaC | 770 | 56 | 70 |
| 8 | Type C 6 + 10% TaC | 802 | 57 | 74 |
| 9 | Type C 6 + 20% TaC | 797 | 58 | 71 |

*Basic alloy containing 13.5% of chromium, 3% of boron, 4.25% of silicon, 0.75% of carbon, 4.75% of iron, balance nickel.
+ Sum of the crack lengths radiating from the pyramidal impression produced by the Vickers Hardness measurement.

As indicated in Table 3, carbides of the elements vanadium, niobium and/or tantalum can be added to one of the known hard alloys, in amounts of 5, 10, or 20% by weight, it being possible, in the case of tantalum carbide, for the proportion to be less than 5% by weight, or more than 20% by weight, in order to obtain good results with regard to hardness and toughness. In contrast, 20% by weight of vanadium carbide gives a relatively high sum of the crack lengths, which is why less than 20% of vanadium carbide is added according to the invention.

When the carbides of the abovementioned elements are added, the other proportions defining the known hard alloy are correspondingly reduced, by the same percentage in each case, so that, for example, in the case of an addition of 10% by weight of tantalum carbide, the total of the proportions making up the known hard alloy amount to 90% by weight.

We claim:
1. A hard alloy consisting essentially of:
22 to 27% by wt. of chromium,
2.5 to 2.7% by wt. of boron,
3 to 4% by wt. of silicon,
4 to 4.5% by wt. of iron, and
2.5 to 3.5% by wt. of carbon,
the balance being nickel.

* * * * *